PROCESS AND APPARATUS FOR MAGNETIC SEPARATION

Filed Feb. 1, 1971 5 Sheets-Sheet 1 inventors
CLAUDE JACQUES VIBERT
LOUIS JEAN THÉODORE LE PAPE

MELVILLE, STRASSER, FOSTER and HOFFMAN
attorneys

PROCESS AND APPARATUS FOR MAGNETIC SEPARATION inventors
CLAUDE JACQUES VIBERT
LOUIS JEAN THÉODORE LE PAPE MELVILLE, STRASSER, FOSTER and HOFFMAN
attorneys

PROCESS AND APPARATUS FOR MAGNETIC SEPARATION inventors
CLAUDE JACQUES VIBERT
LOUIS JEAN THÉODORE LE PAPE MELVILLE, STRASSER, FOSTER and HOFFMAN
attorneys inventors
CLAUDE JACQUES VIBERT
LOUIS JEAN THÉODORE LE PAPE MELVILLE, STRASSER, FOSTER and HOFFMAN
attorneys inventors
CLAUDE JACQUES VIBERT
LOUIS JEAN THÉODORE LE PAPE MELVILLE, STRASSER, FOSTER and HOFFMAN
attorneys

United States Patent Office 3,702,133

Patented Nov. 7, 1972

3,702,133
PROCESS AND APPARATUS FOR MAGNETIC SEPARATION

Claude Jacques Vibert and Louis Jean Theodore Le Pape, Viviers, France, assignors to Societe Anonyme: Ciments Lafarge, Menier, and Etablissement Public: Agence Nationale de Valorisation de la Recherche (CANVAR), Paris, France Filed Feb. 1, 1971, Ser. No. 111,576
Claims priority, application France, Feb. 6, 1970, 7004306
Int. Cl. B07c 5/344
U.S. Cl. 209—81 A 9 Claims

ABSTRACT OF THE DISCLOSURE

A method and apparatus for separating materials. The materials to be separated are loaded in parallel rows on a conveyor belt and pass by a demagnetising apparatus, a magnetising apparatus and then a sensor. An isolating apparatus is located downstream of the sensor to physically separate portions of the materials. Upon the detection of a magnetic field of a predetermined intensity the sensor produces a signal which is carried to the isolating apparatus via an amplifier and a delay device which compensate for the time taken for a portion of the materials to be conveyed from the sensor to the isolating apparatus. The sensor is preferably a differential induction device. The sensor may be rotary in which case it is useful for separating finely crushed or powdery materials.

The present invention relates to a method and apparatus for the magnetic screening of composite or heterogeneous materials, particularly ores and limestone rocks intended for the manufacture of cement. Such process and apparatus are in particular intended to eliminate from the rocks certain elements such as those known as "dykes," the presence of above a certain amount of which in certain types of limestone prevents their use in the making of cement, and often makes it necessary to abandon the working of quarries of appreciable importance.

An object of the invention is therefore to enrich certain materials and/or to improve their final qualities by the elimination of various impurities, or, under certain conditions, controlling the content of these impurities.

It frequently happens that the stones, ores or materials extracted from a mine or a quarry are not homogeneous, but have, on the contrary, parts that are more or less rich in desired constituents which are usefully workable, and parts that are more or less poor or even lacking in these constituents, which parts have to be eliminated or processed separately. The stone or the ore may also be found to be associated with some undesirable impurities, the effect of which is to harm the quality of the final product. Finally, materials of other origins, such as, for example, industrial or consumer waste products may, as run-of-source or run-of-crusher products, also comprise constituents to be retained and others to be rejected or separated.

Numerous chemical processes have already been proposed to solve aspects of this problem and certain have used, in addition, magnetic devices to extract constituents of a material, whether for acceptance or discard.

It is well known that all substances, to a greater or lesser degree, have the property of becoming magnetised when they are placed in a magnetic field. The magnetisation thus acquired may be a temporary induced magnetisation proportional to the field in which the body is found, which disappears as soon as the field is removed. Other substances, subjected to a magnetic field, retain however a residual magnetisation when the magnetic field which magnetised them is removed; they thus become "permanent" magnets and are designated by the name of ferromagnetic substances. Almost all rocks, stones or ores, even those not usually considered to be magnetic, possess a certain ferromagnetism for they are almost always contaminated by more or less appreciable amounts—sometimes by mere traces—of highly ferromagnetic minerals, such as magnetite. That is why, of course, it has already been proposed to use these magnetic properties of substances to sort materials or ores, particularly by causing deflection of the course of magnetic particles by means of permanent magnets or electromagnets. All these known processes have the drawback of requiring complicated apparatus and, consequently, high investment. Moreover, apparatus making use of the magnetic properties of the materials processed enables only the deflection of particles of materials having a relatively high magnetic susceptibility and is much too insensitive, and therefore inoperative, in the more usual case where the susceptibility of the materials is too low for even an intense magnetic field to be able to cause appreciable deflection of their course.

The principal object of the invention is to utilize the variations of magnetic field caused in their vicinity by the varous constituents or portions of materials to be treated to effect the magnetic screening or differentiating thereof.

According to the invention, a method of magnetically separating materials comprises continuously moving the materials to be separated, at least one of which has an induced or residual magnetic field, past at least one receptor or sensor sensitive to magnetic fields, and utilising differentiating signals produced by said receptor to control means operative to separate said materials in response to said signals.

It will be understood that the signals transmitted by the sensor(s) or receptor(s) may be utilised to indicate the relative proportion of constituents of differing magnetic properties found in an ore or other material.

In view of the fact that the natural magnetisation of materials is sometimes too low to be detected easily, or that the polarity of the magnetisation is random owing for example, to previous treatments undergone by the materials or that fragments of differently oriented magnetisation may come adjacent the receptor or sensor simultaneously, it is possible either to magnetise the materials before presenting them to the sensor or receptor by subjecting them to an artificial magnetic field much more intense than the naturally occurring field (earth field), set up by electromagnets excited by a direct current or strong permanent magnets; preferably the materials are previously demagnetised by subjecting them to an alternating magnetic field, either just before they are remagnetised, or in a previous demagnetisation treatment.

In the case of paramagnetic or diamagnetic materials, the magnetisation of which is induced and temporary, it is preferable to present these materials continuously to the receptor or sensor in an intense magnetic field created in a gap in a magnetic circuit comprising an electromagnet or powerful permanent magnets, the sensor(s) or receptor(s) being associated with the said electromagnet or the said magnets, and as near as possible to the materials passing through the gap. The magnetisation acquired by the materials as they pass through the gap acts upon the sensor(s) or receptor(s) both in the case of induced magnetisation and in the case of residual magnetisation. This arrangement, necessary for the paramagnetic or diamagnetic materials, may also be suitable for ferromagnetic materials; normally, permanent magnets should be employed rather than electromagnets, since if energizing current of an electromagnet is not held strictly constant, variations of the magnetic field result to which the sensor(s) or receptor(s) are subjected, and these variations may give rise to signals larger than those (it is) desired to detect. As already described, the materials to be separated may also be demagnetised before being presented to the gap in the magnetic circuit.

Apparatus according to the invention for separating materials comprises means for supporting or conveying materials to be separated, at least one receptor or sensor adjacent said conveying means and operative to produce a differentiating signal in response to the magnetic fields of the materials being conveyed, means to cause a relative motion between sensor and materials, f.i. means to drive said conveying means, and downstream from the receptor relative to the direction of motion of the conveying means, means for isolating from the remainder of the materials portions causing the receptor or sensor to transmit a signal above a predetermined magnitude, the isolating means being controlled by the differentiating signal which is present through a circuit or device imposing a delay thereon in accordance with the rate of the said relative motion, f.i. the time taken for material to be conveyed from the receptor to the isolating apparatus or ejector. The signal is preferably connected, via suitable delay means, with the isolating means through an amplifier, this connection only being established whilst material is actually passing the sensor or receptor: for example, from the moment a lump of material begins to pass the receptor or sensor until the moment it has passed the receptor or sensor.

The apparatus may include means of demagnetising the crushed or powdered materials to be separated or differentiated mounted upstream of means for magnetising the materials, the latter being situated upstream of or adjacent the receptor.

The means for supporting the materials may be an endless conveyor belt, preferably having a surface provided with a plurality of parallel rows of equally spaced pockets or cells into each of which a portion of the material can be loaded. The belt may alternatively be smooth, in such a case pieces of material are arranged preferably in parallel rows, but without being equidistant from one another in each row. Or a smooth surfaced belt may be covered with a uniform thickness of powdery material. In each case the belt is driven by any suitable means at a substantially constant speed. Preferably, at least a part of the supporting structure for the conveyor belt such as runners and supporting rollers are of a non-magnetic material such as tetrachlorofluoroethylene sold under the registered trademark Teflon.

The receptor or sensor may be any device operative to produce a signal in response to a variation in magnetic flux, and thus to supply a means of controlling the isolating apparatus, for example, a moving magnet magnetometer, an inductive pickup, a Hall effect device, a nuclear resonance device, or an optical pumping device. In practice, to permit of satisfactory operation under the difficult conditions encountered on extraction sites, a heavy-duty form of receptor is preferred which is insensitive, for example, to temperature variations, mechanical vibrations, and electrical or magnetic disturbances a few meters away from the apparatus, originating for example from motors, trucks and magnetic masses moved at some distance from the receptor or sensor. The receptor or sensor must, on the other hand, be highly sensitive merely to the fields of magnetised materials which pass adjacent to it, so that its sensitivity to such fields is not appreciably reduced. A differential inductance device is a form of sensor or receptor which satisfactorily meets these conditions.

Such a receptor may advantageously be of the type described in the U.S. patent application filed on the same day as the present application in the name of Louis Paul Emile Cagniard.

The receptor or sensor comprises two entirely symmetrical magnetic circuits with a gap therebetween. Such a receptor or sensor may have at least one coil, with or without a permeable magnetic core, arranged horizontally beneath and very close to the conveyor belt, each coil having its larger dimension transverse to the belt, the "lower" coil(s) being advantageously rigidly located in relation to at least one identical "upper" coil arranged above the lower coils and the belt and at a certain distance from the latter, the upper and lower coils being series connected in such a way that the currents induced in the coils by the magnetic field of material passing between them on the belt be of the same polarity and thus be summed, and at least one third coil of any configuration arranged parallel to the upper and lower coils and rigidly located in relation thereto, the third coil or coils also being connected in series with the other two in such a sense that the resultant current through the three coils is nil if the field influencing the upper, lower and third coils is uniform, said third coil or coils being preferably arranged at some distance above or below the first two in such a way that the flux acting thereon and produced by materials on the belt is minimal in comparison with said flux through the first two coils. Under these conditions, vibration of the receptor or sensor constituted by the various coils does not give rise to any interference signal. Similarly, displacement of a ferrous body such as a truck occurring at a distance from the receptor or sensor which is great compared with the dimensions of the receptor creates practically no disturbance, and the same applies to phenomena such as natural fluctuations of the earth's magnetic field and magnetic storms.

The differentiating signal produced by the receptor (i.e. the resultant current in the coils) may be processed to render it suitable to control the isolating apparatus. It is desirable to integrate the signal, since this will be proportional to the rate of change (derivative relatively to the time) of flux influencing the coils due to the material, and hence its integral is proportional to the actual flux of the field produced by the material. According as to whether the integrated signal exceeds or not a predetermined threshold for any portion of material, so is the isolating apparatus operated or not. The same occurs for each succeeding portion to pass the receptor.

In the case where it is necessary to process finely crushed or powdery materials which are not distributed on the belt in discrete spaced-apart portions, for example powdery materials distributed as a uniform layer over the entire upper surface of the belt, it is preferred to utilise a rotary receptor instead of the stationary receptor described above. This rotary receptor may comprise for example a small coil situated beneath the conveyor belt and rotated about a horizontal axis transverse to the belt by means of a small motor having a high rotation speed in the order of several tens of revolutions per second, thus constituting a small alternator the electromotive force generated thereby being proportional to the field produced by the materials carried, it being understood that the coil is oriented so that during its rotation it is alternately parallel with and perpendicular to the plane of the belt.

Whatever the material may be, the sensors or receptors must be arranged in such a way that a uniform, constant or variable magnetic field extraneous to that originating from the material should not give rise to any signal and that displacement or rotation of the receptor or sensor in the earth's field, under the effect of unavoidable vibration, of wind, etc., should also not give rise to an interference signal. In addition, all precautions should be taken so that the signal generated by the materials passing in the immediate vicinity of the receptor or sensor should not be disturbed as a result of interference by the fields of materials which are approaching or moving away from the receptor, in the cases when the apparatus is broad enough to simultaneously process, with different receptors or sensors several independent differentiating "channels," each of said latter being provided with a proper sensor and a proper isolating apparatus.

Various embodiments of the invention are described with reference to the accompanying drawings, wherein:

FIG. 1 shows an apparatus intended for the sorting of crushed materials such as stone in lumps, the dimensions of which—length, width, height—are of the order of ten centimeters.

Figure 1:
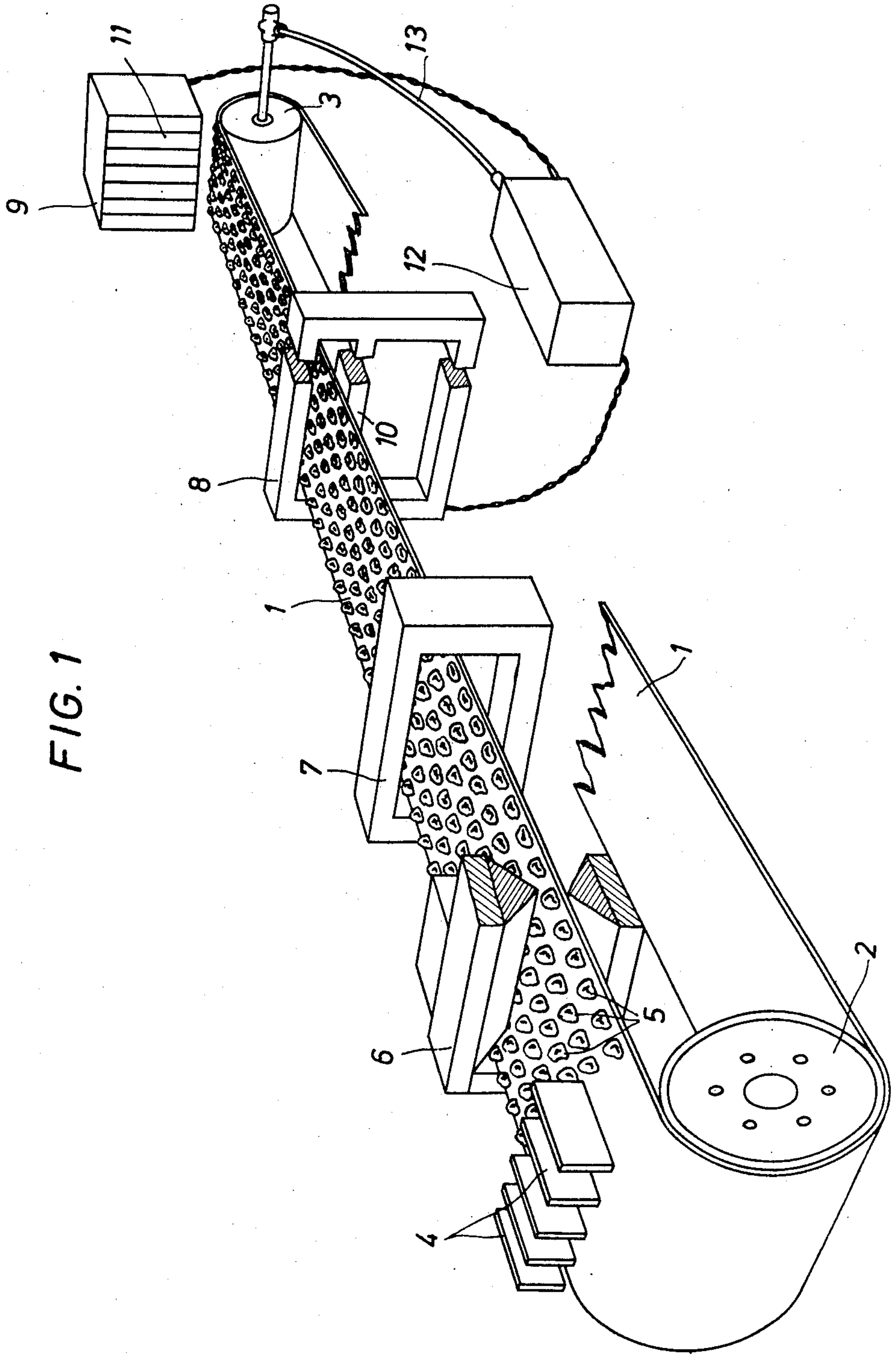
FIG. 1 is a general view in perspective of apparatus according to the invention.

The apparatus comprises a conveyor belt 1 driven by any suitable known means (not shown), and supported on rollers 2 and 3; drive means is arranged to drive the belt at a substantially constant speed. To obtain a reasonable throughput of material, the belt is relatively wide, for example, approximately 1 meter, and the materials are deposited on it in a number, for example ten (parallel rows), each row being approximately 10 cm. wide, so as to enable the material to be sorted lump by lump; this distribution in rows is effected in the example shown by a gating at the loading end of the belt.

The lumps 5 in each row are presented one behind another successively to a demagnetisation apparatus 6; to a magnetisation apparatus 7; to a detector apparatus 8; and to an isolating apparatus (ejector) 9.

In the example shown, the demagnetisation apparatus 6 and magnetisation apparatus 7 are common to all the rows in such a way as to create more or less uniform fields effects across the width of the belt 1. The detection apparatus 8 and isolating apparatus 9 have, on the other hand, a magnetic receptor or sensor 10 and an isolating element or ejector 11 for each row.

When a magnetic receptor or sensor 10 detects a lump 5 to be isolated from the stones in the row that it examines, it issues a signal which is processed and shaped, and delayed proportionately to the speed of the belt 1 and to the distance between the receptor or sensor 10 and the associated isolating element or ejector 11 so as to actuate the latter only when the lump reaches a position in which the said isolating element can act upon it.

For this purpose, the receptor or sensor 10 is connected to a control box 12 which contains appropriate electronic circuitry; the necessary delay may be achieved by means of any appropriate type of delay circuit or memory, the duration of this delay being adjusted in accordance with the speed of the belt by a transmission 13 connected to roller 3 and the box 12.

The demagnetisation apparatus 6 which is not shown in detail simply comprises coils supplied with alternating current to set up an alternating magnetic field the peak intensity of which exceeds that of the fields to which the material may previously have been subjected (generally the earth's field). The amplitude of this field decreases as the stones move away from the demagnetisation apparatus 6 and is negligible by the time they reach the magnetisation apparatus 7.

Figure 2:
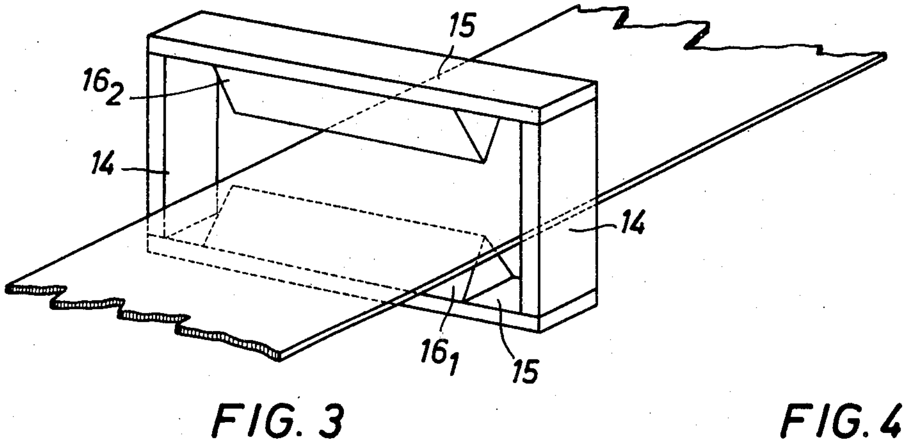
FIG. 2 is a perspective view of a magnetisation device.
Figure 3:
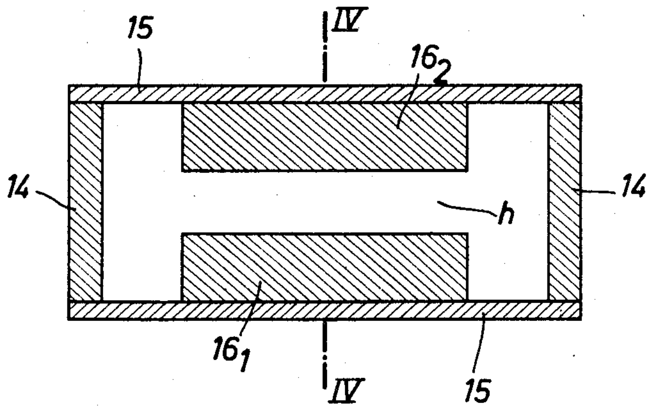
FIG. 3 is a cross-sectional view of the device in FIG. 2.
Figure 4:
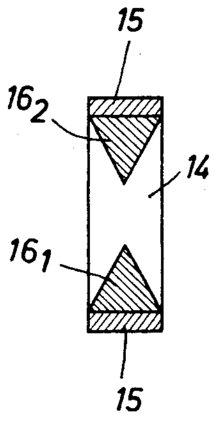
FIG. 4 is a cross-sectional view on the line IV—IV of FIG. 3.

The embodiment of magnetisation apparatus shown in FIGS. 2 to 4 comprises bar magnets 14 arranged vertically on either side of the belt 1. The common poles of these magnets are joined by yokes 15 of soft iron, arranged horizontally. Soft iron pole pieces 16 tend to concentrate the field in the gap through which the lumps 5 pass on the belt, the lower pole piece $\mathbf{16_1}$ being placed just beneath the belt 1 and the upper pole piece $\mathbf{16_2}$ about ten or fifteen centimeters above the belt 1. The lumps 5 are thus vertically magnetised with common polarity.

Figure 6:
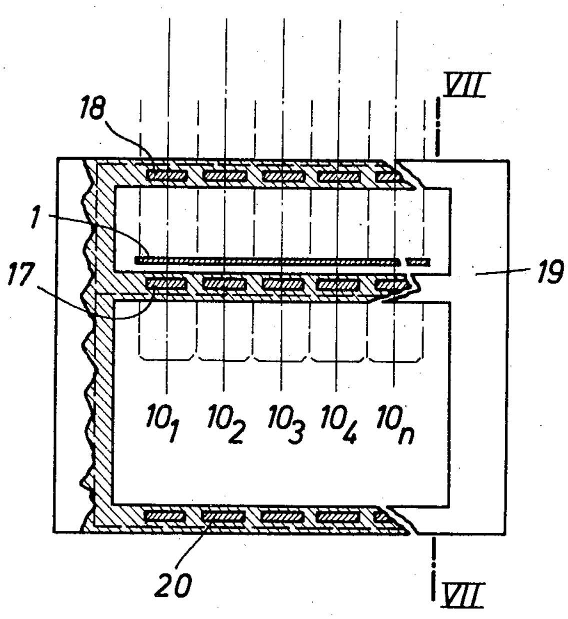
FIG. 6 is a partially broken away elevation of the receptor of FIG. 5.
Figure 7:
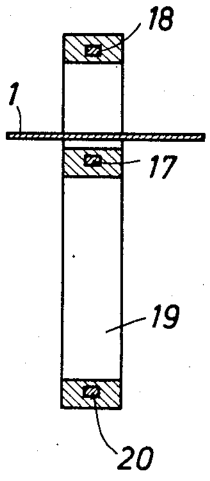
FIG. 7 is a cross-section on the line VII—VII in FIG. 6.

The detector unit 8 (see FIGS. 5–7) comprises magnetic receptors $\mathbf{10_1} \ldots \mathbf{10_n}$, *n* being the number of rows of lumps 5. Each receptor or sensor 10 comprises a flat rectangular coil 17 about eight cm. long, for example, and 1 to 2 cm. wide, arranged horizontally beneath the belt 1 with its length transverse to the belt. Another identical coil 18 is preferably provided above the coil 17, approximately ten or fifteen centimeters above the belt. In each sensor or receptor, the coils 17 and 18 are rigidly mounted relative to each other in a frame 19 and are connected in series with each other so that currents induced in them by the field of a lump of material passing between them are added to each other. A third coil 20 of any shape, parallel with the other two and also rigidly mounted in relation to them, is also connected in series with them so that the resultant current through the coils 17, 18 and 20 is nil when an external field acts uniformly on the three coils. The third coil 20 is situated at a distance from the first two such that the field acting on it coming from the lumps 5 on the belt is minimal in comparison with the field from this origin acting on the other two coils 17 and 18.

It will be seen, therefore, that a similar receptor or sensor is provided for each row of lumps on the belt, and the rigidity of the entire detection unit 8 is ensured by the frame 19. It is possible to use only a single coil 20, associated by means of a suitable coupling with each of the pairs of coils 17 and 18.

Because of said rigidity of the detection assembly, any vibration of the coils whole, or the displacements of a ferrous mass, such as a vehicle, occurring at a distance from the receptors or sensors that is great in relation to the total dimensions of any one of them, do practically not produce any disturbance or significant resultant signal; the same obviously applies to phenomena such as the natural fluctuations of the earth's magnetic field and magnetic storms.

Figure 8:
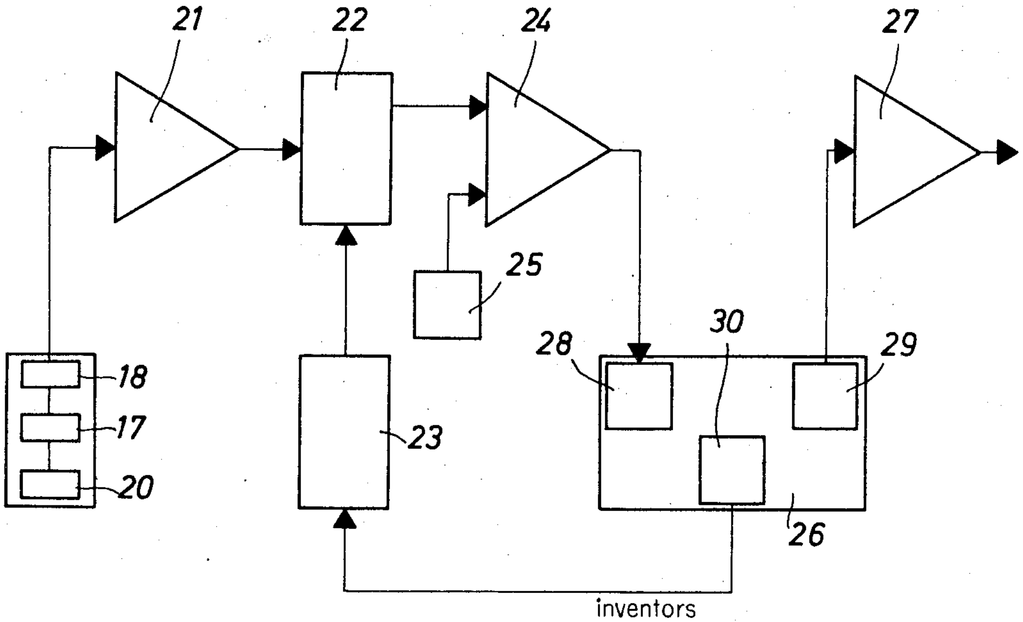
FIG. 8 is a block diagram of an embodiment of electronic circuitry associated with the receptor of FIG. 5.

The passage of a magnetised lump 5 through the receptor or sensor 10 corresponding to its row produces at the terminals of the assembly of coils 17, 18, 20 making up the receptor of an electrical signal which may be processed in various ways finally to control the isolating or ejection mechanism 11 of the row in question. The block diagram of FIG. 8 represents a circuit suitable for this processing, with a view to the detection of the properties of successive lumps. The circuitry is contained in the box 12 (FIG. 1). The signal produced by the receptor 10 comprising the coils 17, 18 and 20 is applied to the input of a pre-amplifier 21, whose output is passed to an integrator 22 which provides at its output a potential proportional to the flux or intensity of the field applied to the receptor or sensor by each successive lump 5, since the signal induced in said receptor is proportional to the derivative with respect to time of the induction flux. Assuming, which is preferable in order to obtain optimum sorting performance, that the lumps 5 in a row are regularly spaced on the belt 1, for example, by being placed in equidistant pockets or cells (not shown) in the surface of the belt, a gate 23 is employed to activate the integrator at the precise moment when a lump begins to pass the receptor 10 and to cut it off as soon as the lump passes beyond the receptor or sensor. The integrated signal is applied to a comparator 24. According as to whether or not it has exceeded a predetermined reference threshold determined by the circuit 25, the signal is transmitted or blocked by the comparator 24. If the signal is transmitted, it is applied to a delay line 26 which stores it until the lump 5 which gave rise to the signal has moved from the receptor or sensor 10 to the ejector 11; whereupon the delayed signal is applied to a power amplifier 27 whose output operates the ejector.

The delay line 26 in the present embodiment comprises an endless loop of magnetic tape, the input signal to the delay line being applied to the tape by a recording head 28 and recovered from it by a reading head 29; whose distance along the tape from the recording head may be adjusted according to the delay needed. By driving the tape loop through the transmission 13 (FIG. 13) the speed of passage of the magnetic tape is constantly maintained proportional to that of the conveyor belt 1. The magnetic tape provides at least as many recording tracks as there are rows provided on the belt. It may even carry permanently recorded on an additional track signals the beginning and the end of which correspond to the beginning and to the end of the passage of the lumps past the receptors or sensors in the detection unit 8; the latter signals, read by an additional reading head 30 (which may be located on the same support as the head 29) control through the gate circuit 23 the beginning and the end of the integration carried out by the integrator 22.

The advantage of this arrangement is that it improves the signal/noise ratio of the circuit.

It will be noted in this connection that when the lumps follow one another on the same row of a plain belt with varying spacings, or even touching, it is no longer practical to control the integration period of the signals supplied. The comparator 24 then receives a continuously variable signal showing several successive maxima and minima when several magnetised lumps follow each other. In this case, the reference threshold is adjusted by the circuit 25 to a level intermediate between the maxima and minima. It will be easily appreciated that the level of these maxima and minima may vary according to the size and the intensity of magnetisation of consecutive or contiguous stones and that some of them are wrongly retained or, on the contrary, wrongly rejected by the isolating elements or ejectors 11; in such cases where a small degree of misclassification of the material is permissible without jeopardizing the required quality of the treated material, account being taken of the fact that in general it is the smaller stones that are likely to escape detection, this shortcoming is preferably tolerated; indeed, the arrangement is simplified, not only by the elimination of the reading head 30 and of the gate-circuit 23 of FIG. 8, but also by the use of a conveyor belt without special accessories (cells) which is capable of a higher throughput at the same speed, and can be loaded in relatively simple manner, whereby the productivity of the plant is thus increased.

Figure 5:
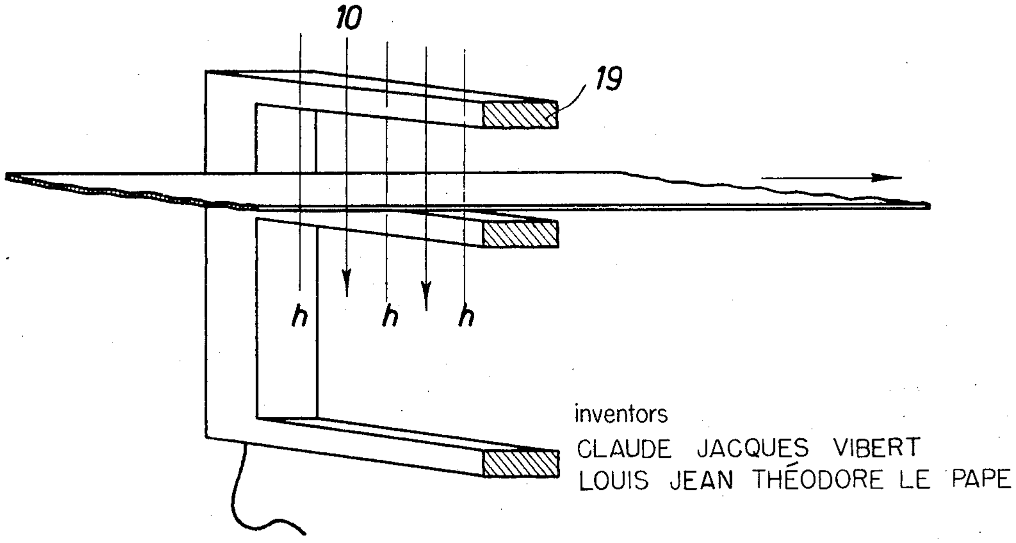
FIG. 5 is a sectioned perspective view of an embodiment of stationary receptor or sensor, adapted to detect distinct portions of material having residual magnetisation.
Figure 9:
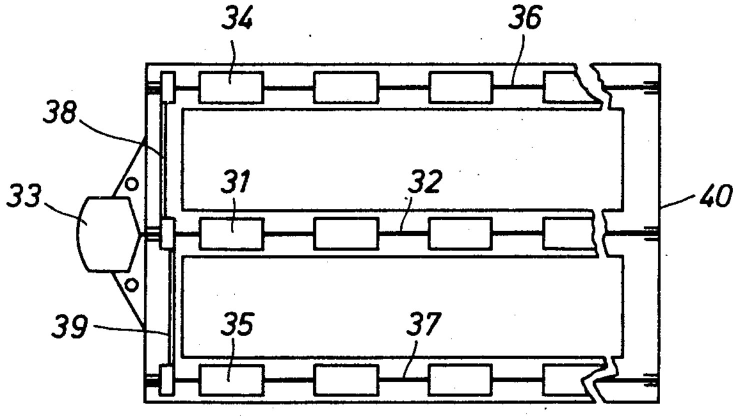
FIG. 9 is a cross-sectional view of an embodiment of rotary receptor or sensor, particularly suited for the treatment of finely crushed or powdery materials.

A rotary magnetic receptor or sensor as shown in FIG. 9 comprises flat coils 31, arranged beneath the belt 1, one for each row of lumps, as in the case of the coils 17 in FIG. 5; these coils 31 are rotated around a horizontal axle 32 transverse to the belt by a small motor 33 with a high rotation speed (of the order of several tens of revolutions per second). Each coil 31 constitutes a small alternator the electromotive force of which is proportional to the induction flux or field produced by an adjacent lump of material. With each coil 31 there are associated in the example shown a coil 34 and a coil 35, driven on axles 36 and 37 respectively, the axles 32, 36 and 37 being journalled in a rigid frame 40 and rotating in perfect synchronism so that at any times the coils 31, 34 and 35 remain parallel; the coils 34 and 35 serve as regards the coils 32 exactly the same roles of addition and of compensation as coils 18 and 20 in relation to coils 17 (see FIG. 5). The coil 35 may here also be singular and associated, by suitable uncoupling, with each pair of coils 31, 34. The synchronism of the three axles is effected by transmissions 38 and 39. The frame 40 ensures the rigidity of this detection unit. Each coil is connected to a set of slip rings from which the signal is taken or picked up as in any alternator.

Figure 10:
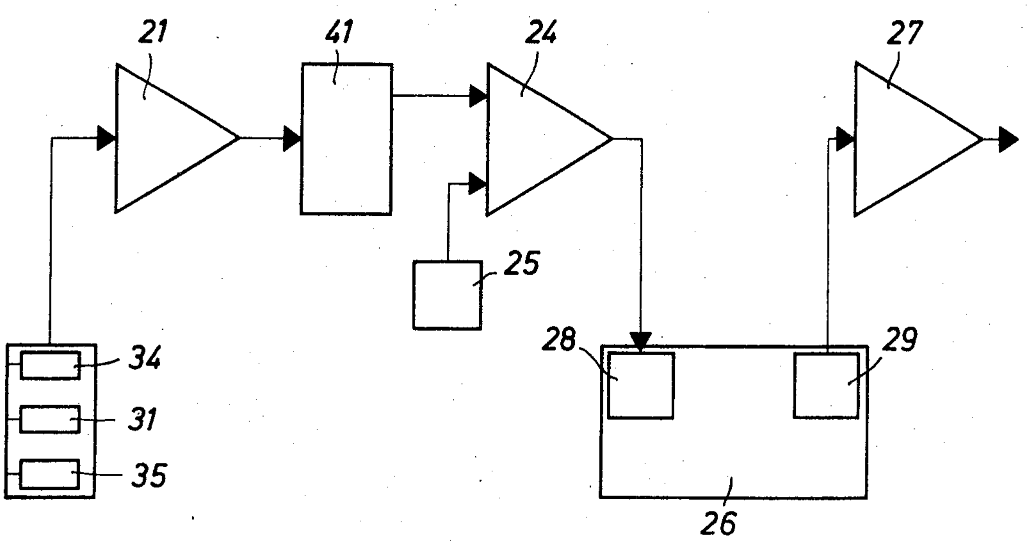
FIG. 10 is a block diagram of electronic circuitry associated with the receptor or sensor of FIG. 9.

FIG. 10 shows the block diagram of the electric circuitry associated with the magnetic receptor or sensor of FIG. 9. Each set of rotating coils 31, 34 and 35, which constitute the receptor 10 for one row, produces a signal which is applied, as previously, to the input of a preamplifier 21 and thence to a detector 41, preferably a synchronous detector, in such a manner as to provide a continuous potential proportional at any moment to the magnetic field of the material adjacent to the receptor or sensor at said moment. This potential is applied to the comparator 24 where it is compared with a reference threshold fixed by the circuit 25 exactly as previously described with respect to the stationary sensor; the remainder of the circuit is the same as in FIG. 8 except that the parts 23 and 30 are eliminated. The rotary receptors or sensors of FIG. 9 are directly responsive to the field intensity to which they are subjected, and no longer to its derivative with respect to time, so that, the signals need not be integrated. The arrangement represented in FIGS. 9 and 10 affords a very great advantage in those cases where the materials to be separated are finely crushed or powdery, and distributed as a uniform layer over the entire surface of the belt; indeed, in this case, if all the materials were uniformly magnetised, the stationary type of receptor described above would not detect any variation of the induction flux and would accordingly be inoperative. On the other hand, with a rotary receptor as described, the fact that the amplitude of the signal obtained is directly proportional to the flux without any integration, makes it possible to operate the isolating or ejection mechanism whenever the field intensity rises above a certain level.

It should be noted that if a rotary receptor or sensor is used for the sorting of distinct objects deposited in equidistant cells, a gate similar to the gate 23 (FIG. 8) described above may be employed, controlling the time of operation of the detector 41, for example.

Figure 11:
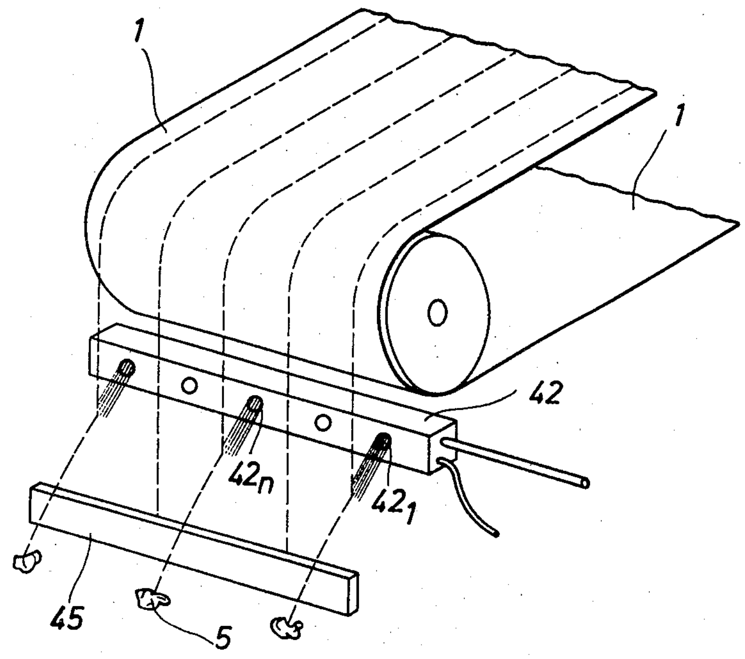
FIG. 11 is a perspective view of one embodiment of an isolating apparatus.
Figure 12:
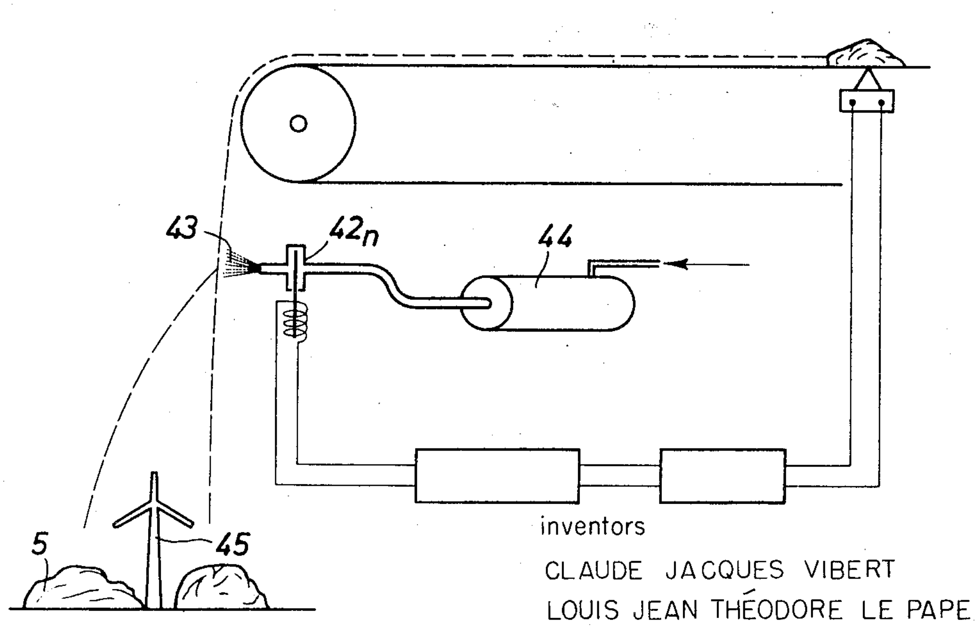
FIG. 12 is a schematic side elevation of the mechanism of FIG. 11.

FIGS. 11 and 12 show preferred isolating or ejection apparatus for use with the apparatus of FIG. 1. It is supposed here that the apparatus is intended for the sorting of limestone which has been previously crushed. It was seen above that lumps 5, of suitable size, were arranged on a conveyor belt 1 in longitudinal rows for presentation to the detection unit 8. Because of the high sensitivity of the receptors or sensors 10 of the detector unit 8 the space between each lump may be nil, that is to say the stones are practically touching. When a lump to be eliminated is detected by one of the receptors or sensors 10, the signal emitted is processed as was indicated above, then put in store on the magnetic tape through a recording head 28. The speed of passage of the magnetic tape is regulated on that of the belt by means of the transmission 13, which may comprise a Selsyn transmitter and motor and a suitable reduction drive. When the signal is read by the reading head 29 and amplified, it operates an electrically operated pneumatic valve $\mathbf{42_n}$ of a bank 42 of valves, one corresponding to each of the receptors or sensors, $\mathbf{10_1}$–$\mathbf{10_n}$, the valve actuated being that corresponding to the receptor or sensor which detected the stone to be eliminated; this valve $\mathbf{42_n}$, of any suitable known type, releases a jet 43 of compressed air. This jet alters the trajectory of the lump 5 as it falls from the belt at the discharge end of the latter and the rejected stone is separated from the remainder and removed. The bank of valves 42 is supplied by a common source of compressed air 44. Each valve is associated with one of the tracks of the magnetic tape loop and therefore to one of the longitudinal rows of lumps, and therefore to one of the receptors or sensors 10. A partition 45 is advantageously placed in a zone 46 where the lumps are being collected, the rejected lumps falling to the left of the partition as shown in FIG. 12.

Such a compressed air device has the advantage of having a very low inertia and of being able to sort lumps individually.

Obviously, other types of isolating apparatus or ejector could be used, for example the type comprising a pusher operating transversely across a conveyor belt, but in that case the lumps need to be disposed in a single row, thus decreasing very considerably the output of the apparatus.

The dimensions and features of the receptors or sensors used may be such that their detection zone varies from a view centimeters to a few cubic decimeters; in the case of an industrial screening plant, the magnetisation device may weigh many tens of kilograms. Generally, the relative proportions of the constituent parts of the apparatus are those shown on the figures, in relation to the width of the belt, the distance between pole pieces having to be greater by a few centimeters than the maximum height envisaged for the materials to be magnetised.

In the foregoing description embodiments of the invention have been described in which the materials to be processed were shifted relative to the detector discriminators. It is also quite obvious that the detection unit may be mobile in relation to the material which is arranged, for example, in cells closed by trap doors; in this case, the detection of a lump to be rejected causes immediate release of the corresponding trap door, causing the lump to fall to a lower level.

What is claimed is:

1. Apparatus for sorting heterogeneous materials of ferro-magnetic, para-magnetic and dia-magnetic characteristices, comprising a conveyor continuously moving at constant speed, means to feed said materials to said conveyor, means to organize the disposition of said materials on said conveyor, means for demagnetizing said materials as they move in a path along said conveyor, means further along said path for magnetizing said materials such that their magnetic fields are all in the same direction, sensing means further along said path and adjacent said conveyor, said sensing means being independent of any variation due to external magnetic fields, and operative to produce a signal in response to induced or residual magnetic fields in said conveyed material, distributing means disposed further along said path, means for transmitting a signal from said sensing means to said distributing means to actuate the same at the point in time when the element of materials sensed arrive at said distributing means, to distribute said materials in accordance with said sensings.

2. An apparatus according to claim 1 wherein the means for carrying the signals from the sensor to said isolating apparatus includes an amplifier, and further comprising means for interrupting the flow of signals from the sensor to the isolating apparatus except when a portion of the materials producing a predetermined magnetic field is adjacent to the sensor.

3. An apparatus according to claim 1, wherein the means for conveying is a conveyor belt.

4. An apparatus according to claim 3, wherein a plurality of parallel rows of cells are provided for receiving portions of materials to be separated.

5. An apparatus according to claim 3, wherein the conveyor belt has a smooth carrying surface, and further comprising means for loading lumps of materials in parallel rows on the conveyor belt.

6. An apparatus according to claim 1, wherein the sensor is a differential induction device.

7. An apparatus according to claim 1, wherein the sensor is stationary.

8. An apparatus according to claim 1, wherein the sensor is rotary.

9. The method of sorting heterogeneous materials of ferro-magnetic, para-magnetic and dia-magnetic characteristics, which include the steps of (a) transporting said materials in an organized manner along a path, (b) subjecting said materials first to an alternating magnetic field, to demagnetize them, (c) subjecting said materials thereafter to a magnetic field to magnetize said materials in a common direction normal to said path, (d) passing said materials next along said path past a sensing station adapted to sense ferro-magnetism or residual magnetism in said materials, (e) passing said materials further along said path to a sorting station, (f) transmitting a signal from said sensing station to said sorting station to be received at said sorting station at the time the material of a particular sensing arrives at said sorting station, and (g) causing said sorting station to separate said materials in accordance with said signal.

References Cited

UNITED STATES PATENTS

| | | | |
|---|---|---|---|
| 1,663,539 | 3/1928 | Bellinger | 209—111.8 |
| 3,478,876 | 11/1969 | Littwin et al. | 209—81 A |
| 3,025,961 | 3/1962 | Yetterland | 209—111.5 X |
| 3,409,129 | 11/1968 | Sperry | 324—34 R |
| 2,620,923 | 12/1952 | Williams | 209—111.8 UX |
| 2,444,751 | 7/1948 | Scott | 209—81 A |
| 2,290,930 | 7/1942 | Wurzbach | 324—34 R |
| 3,075,641 | 1/1963 | Hutter et al. | 209—111.5 |
| 1,640,524 | 8/1927 | Augustine | 209—81 A |

ALLEN N. KNOWLES, Primary Examiner

U.S. Cl. X.R.

209—111.8

UNITED STATES PATENT OFFICE

CERTIFICATE OF CORRECTION

Patent No. 3,702,133 Dated November 7, 1972

Inventor(s) Claude Jacques Vibert & Louis Jean Theodore Le Pape

It is certified that error appears in the above-identified patent and that said Letters Patent are hereby corrected as shown below:

Column 1, line 6, the word "Menier" should be -- Paris --;

Column 1, line 7, the word "(CANVAR)" should be -- (ANVAR) --.

Signed and sealed this 17th day of April 1973.

(SEAL)
Attest:

EDWARD M.FLETCHER,JR.
Attesting Officer

ROBERT GOTTSCHALK
Commissioner of Patents